United States Patent
Iwasaki et al.

(10) Patent No.: US 10,785,999 B2
(45) Date of Patent: Sep. 29, 2020

(54) RICE DOUGH COMPOSITIONS AND GLUTEN-FREE RICE NOODLES MADE THEREFROM

(71) Applicant: Ajinomoto Foods North America, Inc., Ontario, CA (US)

(72) Inventors: Yutaka Iwasaki, Ontario, CA (US); Mikio Takumiya, Ontario, CA (US); Kazuya Hori, Ontario, CA (US); Toshihito Seki, Kawasaki (JP)

(73) Assignee: Ajinomoto Foods North America, Inc., Ontario (CA)

( * ) Notice: Subject to any disclaimer, the term of this patent is extended or adjusted under 35 U.S.C. 154(b) by 0 days.

(21) Appl. No.: 16/265,359

(22) Filed: Feb. 1, 2019

(65) Prior Publication Data
US 2020/0245655 A1 Aug. 6, 2020

(51) Int. Cl.
| | | |
|---|---|---|
| *A23L 7/113* | (2016.01) | |
| *A21D 13/047* | (2017.01) | |
| *A21D 2/16* | (2006.01) | |
| *A21D 10/02* | (2006.01) | |
| *A21D 2/18* | (2006.01) | |

(52) U.S. Cl.
CPC .............. *A23L 7/113* (2016.08); *A21D 2/165* (2013.01); *A21D 2/183* (2013.01); *A21D 10/02* (2013.01); *A21D 13/047* (2017.01); *A23V 2002/00* (2013.01)

(58) Field of Classification Search
None
See application file for complete search history.

(56) References Cited

U.S. PATENT DOCUMENTS

| | | | | |
|---|---|---|---|---|
| 3,948,881 A * | 4/1976 | Strong | ................ | C08B 37/0084 536/2 |
| 4,435,435 A * | 3/1984 | Hsu | ........................ | A23L 7/109 426/451 |
| 5,492,712 A * | 2/1996 | Silver | .................... | A23L 29/238 426/451 |
| 5,609,896 A * | 3/1997 | Cox | ........................ | A23L 7/101 426/102 |
| 6,509,311 B1 * | 1/2003 | Colegrove | ............. | A61K 8/042 424/485 |
| 2012/0021113 A1 * | 1/2012 | Villagran | .................. | A23L 5/11 426/560 |
| 2015/0313244 A1 * | 11/2015 | Lim | ........................ | A21D 2/183 426/549 |

OTHER PUBLICATIONS

Ahn, Karen "One-Minute Pasta! Plus More Revolutionary Pasta-Cooking Hacks You Need to Know." Aug. 14, 2014 https://food-hacks.wonderhowto.com/how-to/one-minute-pasta-plus-more-revolutionary-pasta-cooking-hacks-you-need-know-0156659/ (Year: 2014).*

Tochtrop, Jamey. "Basic Pasta Dough" Jan. 29, 2012 https://www.feastmagazine.com/dine-in/recipe-database/article_25b7d9b2-4901-11e1-9e3a-001a4bcf6878.html (Year: 2012).*

* cited by examiner

*Primary Examiner* — Katherine D Leblanc
(74) *Attorney, Agent, or Firm* — Oblon, McClelland, Maier & Neustadt, L.L.P.

(57) ABSTRACT

A rice dough composition that includes a rice flour from a medium grain rice, xanthan gum, an oil, an alkylene glycol alginate, and water. The rice dough composition is gluten-free and possesses advantageous shapability, viscoelasticity, durability, tackiness, absorbency, and mouthfeel characteristics. A method of making the rice dough composition, a shaped noodle product made therefrom, and a method of making the shaped noodle product are also provided.

18 Claims, No Drawings

RICE DOUGH COMPOSITIONS AND GLUTEN-FREE RICE NOODLES MADE THEREFROM

BACKGROUND OF THE INVENTION

Field of the Invention

The present invention relates to rice dough compositions, shaped noodle products made therefrom, and methods of making the same.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Noodles are generally prepared by mixing raw materials, such as flour, salt, and water, to obtain a dough. The main ingredient in traditional dough, wheat flour, contains gluten (Latin for "glue"), which is responsible for the viscoelastic properties that allow the dough to be worked/kneaded/shaped as desired, and once cooked, for providing the familiar chewy texture associated with noodles.

While gluten is appreciated for providing these viscoelastic properties, gluten is also known to trigger adverse autoimmune reactions responsible for a broad spectrum of gluten-related disorders, including celiac disease, non-celiac gluten sensitivity (NCGS), gluten ataxia, dermatitis herpetiformis (DH), and wheat allergy. Such adverse reactions are mainly caused by gliadin proteins found in gluten, which may induce diarrhea, abdominal cramping, loss of appetite, and failure to thrive in those suffering from such gluten-related disorders. Therefore, there has been an increased interest in producing gluten-free foods by replacing wheat with naturally gluten-free ingredients such as rice, potatoes, and corn.

However, the substitution of wheat ingredients with gluten-free ingredients poses challenges because gluten is the component responsible for forming the required network structure of dough, and there is no similar binding component in gluten-free materials such as rice flour. As such, dough prepared from rice flour or other gluten-free flour sources commonly suffer from one or more of the following problems: (1) the dough is not shapable—it is too dry and has too poor of a connection to be shaped; (2) the dough has poor viscoelasticity—the dough is fragile and tears easily making sheeting, extrusion, and/or transport difficult; (3) the dough is not durable—it can be shaped, processed, and transported initially but becomes fragile over time leading to tears or collapse, for example when the dough is subjected to cutting; (4) the dough is tacky—it adheres/sticks to manufacturing machines and equipment; (5) the dough has low absorbency—it absorbs too little water during parboiling (insufficient swelling) and so more dough is needed to produce a given volume of noodle product leading to increased production costs, and the noodle product obtained from a poorly absorbent dough tends to have an unpleasant texture (see (6)); (6) the noodle product prepared from the dough has poor mouthfeel (poor tasting or has an unpleasant texture or consistency).

One strategy for improving the binding properties of rice flour-based dough is to perform partial dough gelatinization prior to and/or during shaping operations. Partial gelatinization involves exposing the dough to hot water (i.e., hot water during mixing, steam kneading, hot water kneading, etc.) to partially transform the starch component of the rice flour into a gelatinous form. Gelatinization may enhance the binding/viscoelastic properties of the dough so that normal processing (i.e., rolling, pressing, sheeting, extruding, etc.) can be carried out without the dough tearing or breaking. Such treatments however require precise control over temperature (e.g., 70-80° C.) and exposure times, making large scale manufacture difficult if not all together unmanageable.

Another strategy for improving binding properties is to supplement gluten-free flour with additional gelatinized starch, described in US 2013/0337125—incorporated herein by reference in its entirety. However, this strategy also requires partial gelatinization of the added starch component, which complicates the noodle manufacturing process for the same reasons as described above.

SUMMARY OF THE INVENTION

In view of the forgoing, there is a need for gluten-free rice dough compositions that can be made with room temperature water, and that have advantageous shapability, viscoelasticity, durability, tackiness, absorbency, and which are capable of being shaped into gluten-free noodle products with excellent mouthfeel.

Accordingly, it is one object of the present invention to provide novel rice dough compositions with such aforementioned properties.

It is another object of the present disclosure to provide novel methods for making the rice dough compositions.

It is another object of the present disclosure to provide novel shaped noodle products formed from the rice dough compositions.

It is another object of the present disclosure to provide novel methods for making the shaped noodle products.

These and other objects, which will become apparent during the following detailed description, have been achieved by the inventors' discovery that rice dough compositions made using rice flour from medium grain rice, and in particular rice flour from medium grain rice having certain apparent amylose contents, provides rice dough compositions which overcome the problems commonly associated with gluten-free dough materials.

Thus, the present invention provides:

(1) A rice dough composition, comprising:
a rice flour from a medium grain rice;
xanthan gum;
an oil;
an alkylene glycol alginate; and
water.

(2) The rice dough composition of (1), wherein the medium grain rice has an apparent amylose content of 16 to 20 wt. %, based on a total starch content of the medium grain rice.

(3) The rice dough composition of (1) or (2), wherein the medium grain rice has an apparent amylose content of 16.5 to 19 wt. %, based on a total starch content of the medium grain rice.

(4) The rice dough composition of any one of (1) to (3), wherein the rice flour is present in an amount of 50 to 80 wt. %, based on a total weight of the rice dough composition.

(5) The rice dough composition of any one of (1) to (4), wherein the xanthan gum is present in an amount of 0.01 to 2 wt. %, based on a total weight of the rice dough composition.

(6) The rice dough composition of any one of (1) to (5), wherein the oil is a plant-based oil.

(7) The rice dough composition of any one of (1) to (6), wherein the oil is a plant-based oil selected from the group consisting of olive oil, vegetable oil, canola oil, jojoba oil, coconut oil, and palm oil.

(8) The rice dough composition of any one of (1) to (7), wherein the oil is canola oil.

(9) The rice dough composition of any one of (1) to (8), wherein the oil is present in an amount of 0.5 to 10 wt. %, based on a total weight of the rice dough composition.

(10) The rice dough composition of any one of (1) to (9), wherein the alkylene glycol alginate is formed by esterification of alginic acid or a salt thereof with an alkylene oxide.

(11) The rice dough composition of (10), wherein at least 70% of a total number of carboxyl groups present in alginic acid or salt thereof are esterified with the alkylene oxide to form the alkylene glycol alginate.

(12) The rice dough composition of any one of (1) to (11), wherein the alkylene glycol alginate is propylene glycol alginate.

(13) The rice dough composition of any one of (1) to (12), wherein the alkylene glycol alginate is present in an amount of 0.1 to 5 wt. %, based on a total weight of the rice dough composition.

(14) The rice dough composition of any one of (1) to (13), wherein the water is present in an amount of 15 to 45 wt. %, based on a total weight of the rice dough composition.

(15) The rice dough composition of any one of (1) to (14), wherein the rice flour from the medium grain rice is the only flour present.

(16) The rice dough composition of any one of (1) to (15), which is gluten-free.

(17) The rice dough composition of any one of (1) to (16), which contains no additional starch, other than starch present in the rice flour.

(18) A method of making the rice dough composition of any one of (1) to (17), comprising:
adding an emulsion comprising the oil and the water to a dry mix comprising the rice flour, the xanthan gum, and the alkylene glycol alginate; and
mixing.

(19) A shaped noodle product formed from the rice dough composition of any one of (1) to (17), wherein the shaped noodle product is in the shape of a sheet, a sliced noodle, or an extrudate.

(20) The shaped noodle product of (19), which is not frozen.

(21) The shaped noodle product of (19), which is frozen.

(22) A method of making the shaped noodle product of any one of (19) to (21), comprising:
shaping the rice dough composition into the shape of a sheet, a sliced noodle, or an extrudate;
parboiling the shaped rice dough composition; and
optionally freezing to form the shaped noodle product.

The foregoing paragraphs have been provided by way of general introduction, and are not intended to limit the scope of the following claims. The described embodiments, together with further advantages, will be best understood by reference to the following detailed description.

DETAILED DESCRIPTION OF THE INVENTION

In the following description, it is understood that other embodiments may be utilized and structural and operational changes may be made without departure from the scope of the present embodiments disclosed herein.

Definitions

As used herein, "parboiled" or "parboiling" refers to a partial cooking operation where a starch-containing food item (e.g., rice dough) is subjected to hot water treatment, such as boiling, so that the starch component is partially converted into a gelatinous form. In parboiling, the hot water treatment is stopped before the starch-containing food item is fully cooked.

In the present disclosure, rice grains are classified according to their conventional classification and specification. As such, "paddy rice" (rough rice) refers to rice which has retained its husk after threshing, "husked rice" (brown rice or cargo rice) refers to paddy rice from which only the husk has been removed, and "milled rice" (white rice) refers to husked rice from which all or part of the bran and germ or embryo have been removed by milling. The general term "grain" or "rice grain" may refer to any or all of these classifications, unless otherwise specified.

Further, the following rice grain size categories are used herein:

Long grain rice:
When the husked rice has a length/width ratio of 3.1 or more
When the milled rice has a length/width ratio of 3.0 or more.
Medium grain rice:
When the husked rice has a length/width ratio of 2.1-3.0
When the milled rice has a length/width ratio of 2.0-2.9.
Short grain rice:
When the husked rice has a length/width ratio of 2.0 or less
When the milled rice has a length/width ratio of 1.9 or less.

As used herein, the phrase "substantially free", unless otherwise specified, refers to a composition/material which contains less than 1 wt. %, preferably less than 0.5 wt. %, more preferably less than 0.1 wt. %, even more preferably less than 0.05 wt. %, yet even more preferably less than 0.001 wt. %, yet even more preferably 0 wt. % of a particular component, relative to a total weight of the composition/material.

As used herein, the terms "optional" or "optionally" means that the subsequently described event(s) can or cannot occur or the subsequently described component(s) may or may not be present (e.g., 0 wt. %).

As used herein, the term "gluten-free" refers to the amount of gluten (and similar proteins from rye, barley, and hybrids of these grains) in a particular composition/product being less than 20 ppm, more preferably less than 15 ppm, more preferably less than 10 ppm, more preferably less than 5 ppm, more preferably less than 1 ppm, more preferably 0 ppm. Federal guidelines mandate less than 20 ppm gluten for a food product to be characterized as gluten-free, whereas the Gluten-Free Certification Organization mandates that the food product contains less than 10 ppm gluten (5 ppm gliadin) to receive their mark. The amount of gluten in a composition/product may be measured using testing methods that are accepted for gluten testing by analytical associations such as the Association of Analytical Communities (AOAC), the American Association of Cereal Chemists (AACC), and other such agencies as known in the art, for example AACCI Method 38-52.01 "Gluten in Rice Flour and Rice-Based Products by G12 Sandwich ELISA Assay"

and AgraQuant® Gluten G12 ELISA kit, available from Romer Labs UK Ltd. (AOAC-approved Official Method of Analysis, OMA 2014.03).

Rice Dough Composition

The present disclosure is directed to rice dough compositions that are gluten-free, but which still possess binding characteristics which allows the rice dough compositions to be shaped without tearing, breaking, or sticking to processing equipment (e.g., sheeting machine, extruder, etc.), and after cooking provides gluten-free rice noodles with an excellent mouthfeel.

Such rice dough compositions generally include the following components: a rice flour from a medium grain rice, xanthan gum, an oil, an alkylene glycol alginate, and water, and may optionally include various additives such as a preservative, a salt, and a colorant.

Rice Flour

The rice dough composition includes rice flour as a main material without including wheat flour, which may cause gastrointestinal disorders or celiac disease due to the presence of gluten in the wheat flour. The rice flour used in the present disclosure is preferably obtained from a medium grain rice, and together with the other ingredients, forms a dough with a network structure and viscoelasticity similar to that of a dough having gluten with excellent processability.

The amount of the rice flour employed in the rice dough composition may vary, but typically the rice flour is present in an amount of at least 50 wt. %, preferably at least 55 wt. %, more preferably at least 60 wt. %, even more preferably at least 62 wt. %, yet even more preferably at least 63 wt. %, and up to 80 wt. %, preferably up to 75 wt. %, preferably up to 70 wt. %, preferably up to 68 wt. %, preferably up to 66 wt. %, more preferably up to 64 wt. %, based on a total weight of the rice dough composition.

The rice flour may be obtained by milling a medium grain paddy rice, a medium grain brown rice, or a medium grain milled rice. Preferably the rice flour employed herein is obtained from a medium grain brown or milled rice. Any milling process known by those of ordinary skill in the art may be used to obtain the rice flour, including both dry and wet milling processes. In some embodiments, the rice flour has an average particle size of at least 20 µm, preferably at least 30 µm, preferably at least 40 µm, preferably at least 50 and up to 500 µm, preferably up to 400 µm, preferably up to 300 µm, preferably up to 200 µm, preferably up to 100 µm, which is similar to average particle sizes of medium wheat flour, although rice flour having average particle sizes above or below these values are also contemplated.

The most edible portion of rice is starch, which typically accounts for 75 to 80 wt. % of the rice. In addition, rice typically contains 5 to 8 wt. % of proteins, while lipids, fiber, and ash each typically account for about 1 to 3 wt. % of rice. Rice is also usually enriched with minerals and vitamins.

Rice starch is composed of two components, amylose and amylopectin, and the relative amounts of these components in the starch of the rice flour may influence the viscoelasticity and texture of the rice dough, as well as the eating and cooking quality of any noodle product made from the rice dough.

Preferably, the rice flour used herein is obtained from a medium grain rice. In preferred embodiments, the rice flour is obtained from a medium grain rice having an apparent amylose content (AAC) of at least 10 wt. %, preferably at least 11 wt. %, preferably at least 12 wt. %, preferably at least 13 wt. %, preferably at least 14 wt. %, preferably at least 15 wt. %, preferably at least 16 wt. %, preferably at least 16.5 wt. %, preferably at least 17 wt. %, and up to 23 wt. %, preferably up to 22 wt. %, preferably up to 21 wt. %, preferably up to 20 wt. %, preferably up to 19 wt. %, preferably up to 18.5 wt. %, based on a total starch content of the medium grain rice. The apparent amylose content (AAC) may be measured according to the amylose/amylopectin assay kit/procedure, K-AMYL 06/18, commercially available from Megazyme.

The rice dough compositions herein may contain rice flour from any medium grain rice variety, suitable examples include, but are not limited to, arborio, loto, baldo, carnaroli, calasparra, bomba, vialone, California medium grain, medium grain ribe, standard medium grain, premium medium grain, and the like and combinations thereof, as well as other types of specialty medium grain varieties. In preferred embodiments, the rice flour is sourced from arborio and/or premium medium grain rice. Particular examples of medium grain rice include, but are not limited to, M-104, M-202, M-205, M-206, M-208, M-401, and M-402.

The inventors have unexpectedly found that rice flour made from medium grain rice, and in particular medium grain rice with the apparent amylose content recited previously, provides rice dough compositions which are superior to those made from either short grain or long grain rice in terms of viscoelasticity properties, processability, and mouthfeel of the noodle product made therefrom. As will become clear, it has been discovered that rice dough compositions that include rice flour from medium grain rice can be kneaded, shaped (e.g., sheeted, extruded, etc.) and/or transported without tearing, breaking and/or collapsing, can be processed without sticking to production machinery or equipment, do not require the use of water at elevated temperature (e.g., >35° C.) for gelatinization during rice dough manufacture, are highly absorbent (i.e., parboiling results in a volume increase of more than 50%), and provide noodles with an excellent mouthfeel. On the other hand, it has been found that rice dough prepared from short and/or long grain rice flours suffer from one or more of these problems (1) to (6) common to gluten-free dough mentioned previously. It is especially surprising that rice dough compositions prepared with short grain rice flour possess poor viscoelastic properties and processability, as short grain rice tends to have higher binding, adhesion, stickiness properties compared to that of medium grain rice.

Alkali spreading value (ASV) is assessed by the extent of dispersal of whole milled rice grains in dilute alkali solution (1.7% potassium hydroxide) at room temperature for 23 hours and measuring the degree of spreading using a seven point scale as described in Juliano, B. "Criteria and tests for rice grain quality" Rice chemistry and technology, $2^{nd}$ ed. Am. Assoc. Cereal Chemists (AACC), St. Paul, Minn., 1985, pg. 443-513—incorporated herein by reference in its entirety. The ASV is inversely correlated to the gelatinization temperature (GT), with rice grains having a low, intermediate, and high GT showing complete disintegration, partial disintegration, and no effect in the dilute alkali solution, respectively. GT is in turn positively correlated with the amount of time required to cook the rice, that is, rice varieties with a high GT require more water and cooking time than those with a low or intermediate GT. Therefore, the alkali spreading value (ASV) can be used as a measure of the eating and cooking quality of rice. In some embodiments, the rice flour employed herein is obtained from a medium grain rice having an average alkali spreading value (ASV) of at least 6, preferably at least 6.2, preferably at least 6.4, preferably at least 6.6, and up to 7.

In some embodiments, the rice dough compositions contain rice flour, the majority of which is rice flour from medium grain rice, with minor amounts of rice flour from long grain rice, short grain rice, or both, and where the total amount of rice flour from long grain and/or short grain rice does not exceed 30 wt. %, preferably does not exceed 20 wt. %, preferably does not exceed 10 wt. %, preferably does not exceed 5 wt. %, relative to a total weight of rice flour (medium+long+short). In preferred embodiments, the rice dough compositions are substantially free of long grain rice flour, short grain rice flour, or both. In more preferred embodiments, medium grain rice flour is the only rice flour present in the rice dough compositions herein.

Short grain rice varieties may include standard short grain rice, glutinous short grain rice, premium short grain rice, low amylose short grain rice, and the like. Exemplary short grain rice varieties may include, but is not limited to, *japonica* rice including both uruchimai and mochigome, bomba, valencia, short grain arborio rice, with specific mention being made to standard short grain (e.g., S-102), koshihikari, hitomebore, akitakomachi, tamaki, calhikari (e.g., calhikare-201 and 202), calmochi (e.g., calmochi-101 and 203), and calamy-low (e.g., calamylow-201).

Long grain rice varieties may include standard long grain rice, aromatic long grain rice, superior long grain rice, and the like. Exemplary long grain rice varieties may include, but is not limited to, basmati, jasmine, calmati, standard long grain white rice, standard long grain brown rice, with specific mention being made to L-205, L-206, Calmati-201, Calmati-202, and A-202.

The rice dough compositions described herein are preferably gluten-free, and thus are substantially free of wheat flour. In addition to replacing wheat flour with rice flour as a main ingredient, the rice dough compositions are also preferably substantially free of any other materials that may contain gluten, so as to maintain a "gluten-free" designation.

In some embodiments, the rice dough compositions may optionally include other types of gluten-free flour, in addition to the rice flour described above. Suitable examples of such additional types of gluten-free flour include, but are not limited to, corn flour, potato flour, tapioca flour (derived from cassava), amaranth flour, arrowroot flour, sorghum flour Jowar), teff flour, chia seed flour, pure buckwheat flour, gram flour (derived from chick-peas), rice flour, millet flour, oat flour, and *quinoa* flour, almond flour, coconut flour, tigernut flour, and garbanzo flour, as well as combinations thereof.

In preferred embodiments, the rice dough compositions are substantially free of additional gluten-free flour (gluten-free flour other than rice flour), such as those listed above. In preferred embodiments, the rice flour from the medium grain rice is the only type of flour present in the rice dough compositions.

In some embodiments, the rice dough compositions may optionally include additional starch (i.e., a starch component, other than the starch originating from the medium grain rice flour, which is added to the rice dough compositions to increase the total starch content). In preferred embodiments, the rice dough compositions are substantially free of additional starch, including supplemental rice starch. Additional starch materials may include, but are not limited to, cornstarch, tapioca starch, arrowroot starch, wheat starch, supplemental rice starch (i.e., rice starch added to increase the total starch content obtained from rice flour alone), potato starch, sweet potato starch, sago starch, and mung bean starch, including modified or pre-gelatinized versions of such starches.

The rice dough compositions may also optionally include rice flour substitutes in an amount of up to 30 wt. %, preferably up to 20 wt. %, preferably up to 10 wt. %, preferably up to 5 wt. %, relative to the total weight of the rice dough composition. Rice flour substitutes are designed to mimic the properties of rice flour, and when added, allow the rice flour component to be added in lesser quantities. In preferred embodiments, the rice dough compositions are substantially free of rice flour substitutes (e.g. 0 wt. %). Rice flour substitutes are generally known to those of ordinary skill in the art, one example being "SPGF" which is a mixture of rice flour, rice starch, potato starch, xanthan gum and locust bean gum, for example BLGF-FLX-050 commercially available from Bay State Milling.

Xanthan Gum

Food-grade gum additives, also called hydrocolloids, are most commonly polysaccharides having a high viscosity at a low concentration, which can serve as a binder, an emulsifier, a stabilizer, an adhesive, a swelling agent, and/or a gel forming agent. Without being bound by theory, food-grade gum additives may help provide the rice dough compositions with a network structure and viscoelasticity similar to those doughs containing gluten. Exemplary food-grade gum additives may include, but are not limited to xanthan gum, guar gum, carrageenan, salts of alginic acid (e.g., sodium alginate, potassium alginate, ammonium alginate, and/or calcium alginate), locust bean gum, agar, tapioca, gelatin, pectin, gum arabic (acacia), inulin, including mixtures or blends of gums such as CARAGUM available from TIC gums.

In preferred embodiments, the rice dough composition includes xanthan gum as a food-grade gum additive. The xanthan gum may most notably support the connection of the rice dough composition during at least mixing and parboiling.

In preferred embodiments, xanthan gum is the only food-grade gum additive present. It has been surprisingly found that xanthan gum is particularly effective in providing the desired binding function, and that use of other common food-grade gums such as tapioca, pectin, and locust bean gum results in rice dough compositions with inferior connectivity that are prone to tearing and/or breaking. The effectiveness of xanthan gum relative to other food-grade gums is unexpected since such gums are often thought to be interchangeable.

In some embodiments, the xanthan gum is present in an amount of at least 0.01 wt. %, preferably at least 0.05 wt. %, preferably at least 0.1 wt. %, preferably at least 0.15 wt. %, preferably at least 0.2 wt. %, and up to 2 wt. %, preferably up to 1 wt. %, preferably up to 0.5 wt. %, preferably up to 0.4 wt. %, preferably up to 0.3 wt. %, preferably up to 0.25 wt. %, based on a total weight of the rice dough composition. Although the amount of xanthan gum can be adjusted as needed, typically when the amount of xanthan gum is within the range above, the binding characteristics and processability of the rice dough composition is excellent.

Oil

In many dough formulations, wheat powder is commonly employed as a process additive to minimize tack and thus adhesion of the dough to processing equipment. However, wheat powder contains gluten, and is therefore preferably not included in the rice dough compositions herein. Instead, an oil is typically included in the rice dough compositions herein for the same purpose, that is, to minimize the tackiness of the rice dough compositions and thus their tendency to stick to processing machinery or equipment (e.g., rollers, belts, sheeting machines, extruders, etc.).

Various edible oils may be utilized. In preferred embodiments, the oil is a plant-based oil. Suitable plant-based oils may include, but are not limited to, olive oil, vegetable oil, canola oil, jojoba oil, coconut oil, and palm oil, rice germ oil (rice bran oil), or any other vegetable oil known in the art, as well as mixtures thereof. In preferred embodiments, the oil is canola oil.

In some embodiments, the oil is present in an amount of at least 0.5 wt. %, preferably at least 1 wt. %, preferably at least 2 wt. %, preferably at least 3 wt. %, preferably at least 4 wt. %, and up to 10 wt. %, preferably up to 9 wt. %, preferably up to 8 wt. %, preferably up to 7 wt. %, preferably up to 6 wt. %, preferably up to 5 wt. %, based on a total weight of the rice dough composition. The amount of oil may be adjusted as needed to provide suitable anti-sticking properties. However, when employed in the amounts above, the rice dough composition typically possesses acceptable tack and does not overly adhere to processing machinery/equipment. A wide range of processing techniques and machinery/equipment can thus be utilized for shaping the rice dough compositions of the present disclosure.

Alkylene Glycol Alginate

Chemically modified alginates may also be included in the rice dough compositions herein as a thickening or stabilizing agent to help support the connection of the dough, for example after heat processing (e.g., parboiling).

Alginic acid is a polyuronic acid generally believed to consist of two uronic acids; mannuronic acid and guluronic acid, the proportions of which vary depending on factors such as, for example, seaweed species, plant age, and seasonal variation. Alginic acid in the form of mixed water insoluble salts, in which the principal cation is calcium, is present in seaweeds of the Class Phaeophyceae, typical examples of which include, but are not limited to, *Fucus vesiculosus, F. spiralis, Ascophyllum nodosum, Macrocystis pyrifera, Alaria esculenta, Laminaria longicruris, L. digitata, L. saccharina,* and *L. cloustoni*. Methods for the recovery of water insoluble alginic acid and its water soluble salts, particularly sodium alginate, are well known, see for example U.S. Pat. No. 3,948,881A and references cited therein, incorporated herein by reference in its entirety.

The chemically modified alginate may be an alkylene glycol alginate. In some embodiments, the alkylene glycol alginate is formed by esterification of alginic acid or a salt thereof with one or more alkylene oxides. Reaction of alginic acids or their salt forms with alkylene oxides leads to the formation of alkylene glycol esters of alginic acid i.e., alkylene glycol alginates. Such esterification reaction methods and procedures are generally known to those of ordinary skill in the art, for example as disclosed in U.S. Pat. No. 3,948,881A and references cited therein, which is incorporated by reference in its entirety.

In some embodiments, the alkylene glycol alginate is present in the rice dough compositions in an amount of at least 0.1 wt. %, preferably at least 0.2 wt. %, preferably at least 0.3 wt. %, preferably at least 0.4 wt. %, preferably at least 0.5 wt. %, and up to 5 wt. %, preferably up to 4 wt. %, preferably up to 3 wt. %, preferably up to 2 wt. %, preferably up to 1 wt. %, based on a total weight of the rice dough composition.

In some embodiments, the alkylene glycol alginate is formed from incomplete esterification of alginic acid, whereby some of the carboxyl groups of alginic acid or salts thereof are esterified with an alkylene oxide, while the remainder remain free or are neutralized with an appropriate alkali base. The alkylene glycol alginate may be a 'standard esterification type', wherein less than 60%, preferably less than 50%, preferably less than 40% of the total number of carboxyl groups of alginic acid are esterified with the alkylene oxide(s), the remaining groups being either free or neutralized with a base. In preferred embodiments, the alkylene glycol alginate is a 'high esterification type' where at least 60%, preferably at least 70%, preferably at least 75%, preferably at least 80%, and up to 90%, preferably up to 85% of a total number of carboxyl groups present in alginic acid or salts thereof are esterified with the alkylene oxide(s) to form the alkylene glycol alginate.

In some embodiments, the alkylene glycol alginate is formed using one or more alkylene oxides having 2 to 6 carbon atoms, preferably 3 to 4 carbon atoms, more preferably 3 carbon atoms. Suitable alkylene oxides specifically contemplated are ethylene oxide, propylene oxide, 1,3-epoxypropane, 1,2-epoxybutane, 2,3-epoxybutane, 1,2-epoxy-2-methylpropane, 1,2-epoxypentane, and 1,2-epoxyhexane, mixtures thereof, as well as any other alkylene oxide known by those of ordinary skill in the art as being appropriate for the preparation of alkylene glycol alginates. Among these alkylene oxides, propylene oxide and butylene oxide are preferred, more preferably propylene oxide.

In preferred embodiments, the alkylene glycol alginate employed herein is propylene glycol alginate (PGA). Propylene glycol alginate is a good thickener which exhibits slight pseudoplastic behavior. Propylene glycol alginates are broken down into grades based on viscosity and esterification levels (i.e., the percentage of esterified carboxyl groups described heretofore), and any grade of propylene glycol alginate may be utilized in the rice dough compositions. Within the category of standard esterification types (e.g., less than 60% of carboxyl groups esterified), the propylene glycol alginate may have the following grades (based on viscosity ranges of a 1 wt. % solution at 20° C.): "LVC" (70 to 170 mPa·s); or "HVC" (200 to 600 mPa·s). Within the category of high esterification types (e.g., 60 to 90% of carboxyl groups esterified), the propylene glycol alginate may have the following grades (based on viscosity ranges of a 1 wt. % solution at 20° C.): "LLV" (15 to 35 mPa·s); "NLS-K" (30 to 60 mPa·s); "LV" (60 to 100 mPa·s); "MV" (100 to 150 mPa·s); and "HV" (150 to 250 mPa·s).

In preferred embodiments, the propylene glycol alginate utilized herein is an "HV" grade, i.e., is of a high esterification type having a viscosity of at least 150 mPa·s, preferably at least 175 mPa·s, preferably at least 200 mPa·s, and up to 250 mPa·s, preferably up to 225 mPa·s, preferably up to 215 mPa·s.

Propylene glycol alginates are available for example from Kimica Corp. under the tradename KIMILOID, for example, KIMILOID HV.

Water

The rice dough compositions further include water in amounts of at least 15 wt. %, preferably at least 20 wt. %, preferably at least 25 wt. %, preferably at least 30 wt. %, and up to 45 wt. %, preferably up to 40 wt. %, preferably up to 35 wt. %, preferably up to 32 wt. %, based on a total weight of the rice dough composition.

Optional Ingredients

Preservative

When the rice dough compositions or any noodle product made therefrom are intended to be kept in cold/freezer storage, the use of preservatives is not necessary or preferred. However, when such products are not intended for cold/freezer storage, one or more preservatives may be optionally included in the rice dough compositions in amounts from 0.001 wt. %, preferably from 0.01 wt. %, preferably from 0.1 wt. %, and up to 2 wt. %, preferably up to 1 wt. %, preferably up to 0.5 wt. %, based on a total weight of the rice dough composition. The preservatives may act as antimicrobials, stabilizers, and/or antioxidants to prevent the growth of mold, the growth of bacteria, degradation or chemical breakdown (e.g., oxidative degradation) so as to keep the dough/noodle fresh for longer periods of time.

Preservatives suitable for use in food are well-known to those skilled in the art. Illustrative examples include, but is not limited to, benzoates (e.g., sodium benzoate, benzoic acid), sorbates (e.g., sorbic acid, sodium sorbate, potassium sorbate), citrates (e.g., citric acid), propionates (e.g., propionic acid), ascorbates (e.g., ascorbic acid, sodium ascorbate), and mixtures thereof.

Salt

A salt may be optionally included in the rice dough compositions. When present, the rice dough compositions may contain up to 5 wt. % of the salt, preferably up to 4 wt. %, preferably up to 3 wt. %, preferably up to 2 wt. %, preferably up to 1 wt. %, preferably up to 0.5 wt. %, preferably up to 0.1 wt. %, based on a total weight of the rice dough compositions. The salt may include, but is not limited to, sodium chloride, calcium chloride, potassium chloride, magnesium chloride, as well as sulfate salts of calcium, potassium, and magnesium, and mixtures thereof, for example sea salt. In preferred embodiments, salt is not included in the rice dough compositions of the present disclosure.

Colorant

The rice dough compositions described herein generally produce noodle products that are white, off-white, or cream in color. However, when it is desired, various colorants may optionally be added to the rice dough compositions to provide noodles having a variety of colors (e.g., red, orange, green, brown, etc.) as is well-known in the art. The colorant may be a dye or a pigment. When present, the rice dough compositions may contain up to 3 wt. %, preferably up to 2 wt. %, preferably up to 1 wt. %, preferably up to 0.5 wt. %, preferably up to 0.1 wt. %, preferably up to 0.01 wt. % of the colorant, based on a total weight of the rice dough composition.

Specific examples of food-grade colorants include, but are not limited to, Blue No. 1 (Brilliant Blue FCF, E133), Blue No. 2 (Indigotine, E132), Green No. 3 (Fast Green FCF, E143), Red No. 3 (Erythrosine, E127), Red No. 40 (Allura Red AC, E129), Yellow No. 5 (Tartrazine, E102), Yellow No. 6 (Sunset Yellow FCF, E110), as well as mixtures thereof.

Binding Enzymes

In order to improve the binding qualities of the rice dough compositions and to form a more durable connection/network, binding enzymes may optionally be included in the rice dough composition. For example, a transglutaminase enzyme may be added as a processing aid to link proteins (for example via isopeptide bond formation of a glutamine and a lysine residue) present in the rice dough composition to afford a more networked and durable dough. When utilized, the binding enzymes may be added to the rice dough compositions in amounts of at least 0.001 wt. %, preferably at least 0.01 wt. %, preferably at least 0.1 wt. %, preferably at least 0.2 wt. %, and up to 0.5 wt. %, preferably up to 0.4 wt. %, preferably up to 0.35 wt. %, based on a total weight of the rice dough composition. Alternatively, the binding enzymes may be added to the rice dough compositions in any amount that provides at least 0.01 units of activity, preferably at least 0.1 units of activity, preferably at least 0.5 units of activity, preferably at least 1 unit of activity, and up to 25 units of activity, preferably up to 15 units of activity, preferably up to 10 units of activity, per gram of the rice dough compositions.

Suitable examples of binding enzymes may include traditional transglutaminase enzymes for protein rich foods such as ACTIVA RM, available from Ajinomoto, as well as any transglutaminase enzyme designed for or capable of being used for plant-based applications, such as AtPng1p described in Mea, M. D. et al. Plant Physiol. 2004, 135(4), pg. 2046-2054 and U.S. Pat. No. 6,030,821A—each incorporated herein by reference in its entirety.

In preferred embodiments, binding enzymes are not employed in the rice dough compositions.

Additional Thickening Agent

Additional thickening agents may optionally be included in the rice dough compositions in addition to the alkylene glycol alginate. Any suitable food-grade thickening agent known to those of ordinary skill in the art may optionally be included in amounts described for the alkylene glycol alginate. Acceptable examples of such thickening agents include, but are not limited to, modified cellulose polymers such as hydroxypropylmethylcellulose (HPMC), methylcellulose (MC), and carboxymethylcellulose (CMC). In preferred embodiments, the rice dough compositions are substantially free of additional thickening agents.

Methods for Making the Rice Dough Composition

Embodiments of the rice dough compositions described herein may be prepared by any method and any suitable technique known to those of ordinary skill in the art. By way of example, the rice dough compositions may be prepared as follows.

A dry mix may be prepared by mixing together all dry ingredients, that is, the rice flour, the xanthan gum, the alkylene glycol alginate, and any other optional ingredient (e.g., the salt) that is in non-liquid form as desired in an appropriate vessel. The ingredients that constitute the dry mix may be added to the vessel in any order and mixed together by stirring, agitating, and/or blending, and this mixing may be accomplished manually or by a mixing machine. In preferred embodiments, the mixing is performed for an amount of time suitable for uniform distribution of each of the ingredients throughout the dry mix, typical mixing times being up to 30 minutes, preferably up to 20 minutes, preferably up to 10 minutes, preferably up to 5 minutes, preferably up to 3 minutes, preferably up to 2 minutes.

Alternatively, a pre-made dry mix may be obtained and subsequently used to make the rice dough composition, for example, the dry mix may be a stand-alone commercial product that is obtained (e.g., purchased) and used as is.

An emulsion, preferably an oil in water emulsion (o/w) where the continuous phase is aqueous, may be separately prepared by mixing together by stirring, agitating, and/or blending an appropriate amount of the oil and the water, and any other optional ingredient that is in the form of a liquid. In preferred embodiments, the emulsion is prepared with a weight ratio of water to oil of at least 1.5:1, preferably at least 2:1, preferably at least 3:1, preferably at least 4:1, preferably at least 5:1, preferably at least 6:1, preferably at least 7:1, and up to 90:1, preferably up to 60:1, preferably up to 30:1, preferably up to 10:1, preferably up to 8:1. In preferred embodiments, the water used to make the emulsion is at or near room temperature, for example, about 20 to 25° C.

The emulsion may next be combined with the dry mix, which can be accomplished by either adding the emulsion to the dry mix, or adding the dry mix to the emulsion. In preferred embodiments, the emulsion is added to the dry mix. The emulsion may be added all at once, or the emulsion may be added slowly/portion wise. In some embodiments, the emulsion is added slowly to the dry mix, preferably with concomitant mixing. In preferred embodiments, the emulsion is added slowly over an addition time of at least 1 minute, preferably at least 2 minutes, and up to 20 minutes, preferably up to 15 minutes, preferably up to 10 minutes, preferably up to 5 minutes.

After combining the emulsion with the dry mix, further mixing may be performed by stirring, agitating, blending, kneading, working, stretching, and/or folding to form the rice dough composition which is then capable of being shaped into the form of a shaped noodle product.

In some embodiments, the water used to make the emulsion may be optionally heated to temperatures above room temperature. For example, the water, and therefore the emulsion, may be heated to a temperature of at least 35° C., preferably at least 40° C., preferably at least 50° C., preferably at least 60° C., and less than 100° C., preferably less than 90° C., preferably less than 80° C., preferably less than 70° C. In this way, when the emulsion is combined with the dry mix, the hot water may partially gelatinize the starch constituent present in the dry mix, leading to dough with improved binding properties and a reduced occurrence of tearing or breaking during any subsequent shaping processes. After combining the emulsion at elevated temperature with the dry mix at room temperature, the resulting combination may have an initial temperature of at least 30° C., preferably at least 32° C., preferably at least 34° C., preferably at least 36° C., and up to 60° C., preferably up to 50° C., preferably up to 45° C., preferably up to 40° C.

However, such gelatinization steps prior to shaping require precise control over the water temperature and hot water exposure times to avoid over cooking the dough. The need for such precise control over the water temperature may be a significant burden for dough production, particularly during manufacture on large scale. Therefore, in preferred embodiments, the rice dough compositions are prepared using water that is at or near room temperature, allowing for facile on-scale manufacture. That partial gelatinization prior to shaping is not a requirement for acceptable dough connectivity/binding properties is thus a major advantage of the rice dough compositions described herein.

Shaped Noodle Product and Methods of Making

The rice dough compositions of the present disclosure possess excellent processability and workability properties, making them well-suited for shaping into a wide variety of shaped noodle products without the tearing, breaking, collapsing, sticking, and/or low absorbing problems associated with many gluten-free noodle products. Thus the present disclosure also provides methods of making shaped noodle products and the shaped noodle products thus obtained.

The method may first involve shaping the rice dough compositions into a shaped rice dough composition.

In some embodiments, the rice dough compositions may be shaped into the form of a sheet. The rice dough compositions may be pressed/sheeted by hand (e.g., roller) or with a sheeting machine. The rice dough composition may be sheeted as many times as appropriate (i.e., once, twice, three times, or more) until a sheeted rice dough is formed having a desired thickness. In preferred embodiments, the rice dough composition is sheeted twice by machine. The method may also optionally involve folding operations, extending/pulling operations, or both to achieve a desired sheet thickness and/or shape.

The sheet may have a wide range of aspect ratios in terms of its longest linear dimension (length) to thickness. In some embodiments, the sheet has an aspect ratio of at least 5:1, preferably at least 6:1, preferably at least 7:1, preferably at least 10:1, and up to 300:1, preferably up to 250:1, preferably up to 200:1, preferably up to 150:1, preferably up to 100:1, preferably up to 50:1. For example, the shaped noodle product may be in the form of a sheet having a length of 15 to 20 cm and a thickness of 1 to 20 mm.

In some embodiments, the rice dough compositions may be shaped into the form a sliced noodle. In preferred embodiments, the sheet is cut/sliced using a cutting machine which is equipped with a slitter and a cutter or waver. Here, the sheet may be cut into noodle strands of desired width by selection of an appropriate slitter. That is, the slitter slices the sheet lengthwise at increments along the width to form a plurality of noodle strands (elongated noodles) with aspect ratio dimensions (length to thickness) described above for the sheet, and with a width dimension equal to the selected slitter spacing as is known by those of ordinary skill in the art. For example, the sliced noodle may have a length to width ratio of at least 20:1, preferably at least 30:1, preferably at least 40:1, and up to 100:1, preferably up to 80:1, preferably up to 60:1. The sliced noodles can be either square or round by using various slitters and may be cut to a desired length with the cutter. Such methods may be used to make long noodle products similar in shape to spaghetti, tagliatelle, fettucinni, vermicelli, to mein, and the like. The noodle strands may also be optionally waved and/or spiraled prior to cutting.

In some embodiments, the rice dough composition is shaped by extruding the rice dough composition through a die to form an extrudate having a fixed cross-sectional profile corresponding to the cross-section of the die. Any shaped noodle product which is obtained by such an extrusion process is considered to be in the form of an extrudate herein. As dies may be produced having a wide range of cross-sectional shapes and sizes, the extrudates may also be formed with various shapes and sizes. After extruding the rice dough composition through the die, the extrudate may be cut to provide any unit length desired. In one non-limiting example, a die can be selected to form extrudates having a thickness of 1 to 1.5 mm, a width of 1 to 1.5 mm, and cut to a length of 20 to 30 cm, although it should be recognized that extrudates having many other dimensions can be made by the methods herein.

The extrudate may be a long noodle, a short noodle, a pastina, or any other type of noodle known to those of ordinary skill in the art that can be obtained by extruding dough through a die. The extrudate may include solid shapes, hollow shapes (e.g., tubular), including flat or textured-flat noodles (e.g., lasagna noodles), tubular noodles (e.g., penne), textured tubular noodles (e.g., tortiglioni), spiraled noodles (e.g., fusilli), and the like.

The rice dough composition is preferably not parboiled or subjected to hot water treatments (e.g., steam treatments, the use of hot water for making the rice dough composition, etc.) prior to shaping. Instead, it is preferable that hot water treatments be used only after shaping the rice dough composition.

In preferred embodiments, the shaped rice dough is parboiled to cause partial gelatinization of the rice starch component contained therein to form a shaped noodle product. In some embodiments, parboiling may be carried out by boiling the shaped rice dough in water (or a salt water or an oil in water emulsion) at a temperature of at least 60° C., preferably at least 70° C., preferably at least 80° C., preferably at least 90° C., and up to 100° C., for no more than three minutes, preferably no more than 2 minutes, preferably no more than 1 minute. Such incomplete cooking may cause the starch component present in the outer portion of each noodle to become gelatinous (i.e., a gelatinized outer shell) while the starch component present within the inner portion of each noodle remains unchanged (i.e., a non-gelatinized core).

In preferred embodiments, parboiling the shaped rice dough affords a volume increase of more than 50%, preferably more than 55%, preferably more than 60%, preferably more than 65%, preferably more than 70%, preferably more than 75%, relative to the original (pre-parboiled) volume of the shaped rice dough. Such a volume increase allows for production of a large amount of shaped noodle product using only small quantities of shaped rice dough, and thus lower production costs.

The shaped noodle product may then be optionally frozen. In some embodiments, the shaped noodle product is not frozen, and is instead used or packaged as is. In preferred embodiments, the shaped noodle product is frozen. The method of freezing is not particularly limiting, and may involve placing the shaped noodle product in a commercial/production freezer (e.g., at temperatures below 0° C.) for an appropriate amount of time to result in product freezing.

The shaped noodle product may also be packaged using conventional packaging techniques known by those of ordinary skill in the art, including optional inerting (deoxidizing) procedures.

The shaped noodle product may include (or be used in dishes including), but not limited to, pho, drunken noodle, pad thai, ramen noodles, potsticker, dumpling skins, traditional rice noodles, kal-guksu, udon, jajangmyeon, sujebi, yakisoba, soba, and pasta noodles (spaghetti, bigoli, rigati, canalini, ziti, vermicelli, maccheroni, rigatoni, penne, fusilli, canneroni, girandole, farfalle, filini, farfalline, ricciutelli, lancette, campanelle, etc.). Of course it should be recognized that the rice dough compositions of the present disclosure, owing to their excellent connectivity and processability, can be shaped into a wide range of shapes having various adjustable dimensions other than the ones specifically listed here, and all such shaped noodle products are contemplated herein.

Extruding procedure: The rice dough compositions were extruded by an extruder to a thickness of 1-1.5 mm and a width of 1-1.5 mm, then cut to a length of 20-30 cm. The extrudates were then parboiled at 90° C. for one minute, and frozen in a production freezer.

Examples 1-12

The rice dough compositions of Examples 1-12 are given below in Table 1 using either rice flour (Calrose medium grain, M-205) or "SPGF" (a rice flour substitute, BLGF-FLX-050 commercially available from Bay State Milling). In Table 1, the amount of each component (raw material) is expressed in terms of weight percent, based on a total weight percent ("Total") calculated as the sum of the individual weight percents of each component. PGA is propylene glycol alginate KIMILOID HV, commercially available from Kimica Corp. ACTIVA RM is a transglutaminase enzyme available from Ajinomoto. Salt is sodium chloride. The water temperature used for making the rice dough compositions is denoted as "water ° C.", and the temperature of the resulting mixture is denoted as "mix ° C.". "r.t." is room temperature (about 23° C.).

In the tables below, * denotes the example is a comparative example.

TABLE 1

Rice dough compositions of Examples 1-12

| Ingredient | *Ex. 1 | *Ex. 2 | *Ex. 3 | *Ex. 4 | *Ex. 5 | *Ex. 6 | *Ex. 7 | *Ex. 8 | *Ex. 9 | *Ex. 10 | Ex. 11 | Ex. 12 |
|---|---|---|---|---|---|---|---|---|---|---|---|---|
| Rice flour | | | 62.0 | 62.0 | 62.0 | 52.0 | | | | | 63.4 | 67.6 |
| SPGF | 62.0 | 62.0 | | | | | 62.0 | 62.0 | 62.0 | 62.0 | | |
| Xanthan gum | | | | | | | | | | | 0.22 | 0.23 |
| PGA | 0.3 | 0.32 | 0.32 | 0.32 | 0.32 | 0.32 | 0.32 | 0.32 | 0.32 | 0.32 | 0.53 | 0.57 |
| Canola oil | | | | | 2.0 | 2.0 | 1.8 | 1.8 | 1.8 | | 4.22 | 4.5 |
| ACTIVA RM | | 0.3 | | | | | | | 0.32 | 0.32 | | |
| Salt | 2.0 | 1.0 | 1.0 | 1.0 | 1.0 | 1.0 | 1.0 | 1.0 | 1.0 | 0.9 | | |
| Tapioca | | | | | | 10.0 | | | | | | |
| Water | 35.7 | 30.8 | 36.68 | 44.0 | 42.0 | 42.0 | 36.1 | 46.1 | 46.1 | 40.1 | 31.7 | 27.1 |
| Total | 100.0 | 94.4 | 100.0 | 107.3 | 107.3 | 107.3 | 101.2 | 111.2 | 111.5 | 103.6 | 100.0 | 100.0 |
| Water ° C. | r.t. | r.t. | r.t. | r.t. | r.t. | r.t. | r.t. | 61.5 | 78.0 | 89.6 | r.t. | r.t. |
| Mix ° C. | r.t. | r.t. | r.t. | r.t. | r.t. | r.t. | r.t. | 40.0 | 49.5 | 39.3 | r.t. | r.t. |

The examples below are intended to further illustrate rice dough compositions, shaped noodle products made therefrom, and their methods of manufacture, and are not intended to limit the scope of the claims.

EXAMPLES

Rice Dough Composition Preparation Methods

For the examples below, rice dough compositions were prepared according to the following procedure: a) the liquid ingredients (e.g., water and/or canola oil) were mixed together using water at the indicated temperature; b) the dry ingredients were mixed by machine for two minutes to form a dry mix; c) the liquid ingredients from a) were added to the dry mix from b) slowly over the course of five minutes and the contents were stirred to form the rice dough compositions.

Shaped Noodle Preparation Methods

Sheeting procedure: The rice dough compositions were sheeted twice by machine to form a sheet having a thickness of 10-20 mm, rolled, then pressed to a thickness of 1-2 mm, and cut to a length of 15-20 cm. The sheet was then sliced/cut to form sliced noodles having a width of 3.75 mm. The sliced noodles were then parboiled at 90° C. for one minute, and frozen in a production freezer.

Evaluation

The rice dough compositions of Examples 1-11 were shaped using the sheeting procedure above, except that Example 10 was sheeted manually with a rolling pin to a thickness of 1.0 mm. Example 12 was shaped using the extruding procedure above. Examples 1-12 were evaluated according to the rating system in Table 2. The results of the evaluation are presented in Table 3.

TABLE 2

Rice dough composition rating system

| Property | "pass" rating | "fail" rating |
|---|---|---|
| 1) Shapability | The dough forms a good connection and can be shaped | The dough is too dry and has too poor of a connection to be shaped |
| 2) Visco-elasticity | The dough can be sheeted or extruded into the dimensions defined above without tearing or breaking | The dough is fragile and tears or breaks when sheeted or extruded into the dimensions defined above |
| 3) Durability | The dough can be sheeted or extruded and maintains the original sheeted or extruded form after aging for 40 | The dough can be sheeted or extruded but the sheet/extrudate tears or collapses after aging for |

TABLE 2-continued

Rice dough composition rating system

| Property | "pass" rating | "fail" rating |
|---|---|---|
| | minutes, and the sheet/extrudate can be cut without breaking | 40 minutes or the sliced noodles break while cutting |
| 4) Tackiness | The dough does not stick to the sheeting machine or extruder | The dough sticks to the sheeting machine or extruder and tears |
| 5) Absorbency | Parboiling the shaped dough causes a volume increase of more than 50% | Parboiling the shaped dough causes a volume increase of 50% or less. |
| 6) Mouthfeel | The cooked noodle product has a pleasant taste, texture, and/or consistency | The cooked noodle product has an unpleasant taste, texture, and/or consistency | designated as the rice ID (rice identification). A description of each rice ID used to make the rice flour component in Examples 11-28 is presented in Tables 4-6.

In the following tables (Tables 4-8), AAC is the Apparent Amylose Content (%) of the rice grain, which is determined according to the amylose/amylopectin assay kit/procedure, K-AMYL 06/18, commercially available from Megazyme. ASV is the alkali spreading value was determined using 1.7% KOH according to Juliano, B. "Criteria and tests for rice grain quality" Rice chemistry and technology, $2^{nd}$ ed. Am. Assoc. Cereal Chemists (AACC), St. Paul, Minn., 1985, pg. 443-513. Pasting Properties were measured according to AACCI Method 61-02.01 "Determination of the pasting properties of rice with the Rapid Visco Analyzer". "MG" is medium grain. "SG" is short grain. "LG" is long grain.

TABLE 3

Evaluation of rice dough compositions of Examples 1-12

| Property | *Ex. 1 | *Ex. 2 | *Ex. 3 | *Ex. 4 | *Ex. 5 | *Ex. 6 | *Ex. 7 | *Ex. 8 | *Ex. 9 | *Ex. 10[b] | Ex. 11 | Ex. 12[c] |
|---|---|---|---|---|---|---|---|---|---|---|---|---|
| (1) Shapability | pass | pass | fail | pass | pass | pass | pass | pass | pass | pass | pass | pass |
| (2) Viscoelasticity | fail | fail | — | pass | pass | pass | pass | pass | pass | pass | pass | pass |
| (3) Durability | — | — | — | pass | pass | fail | fail | fail | pass | pass | pass | pass |
| (4) Tackiness | — | — | — | fail | fail | fail | pass | pass | pass | pass | pass | pass |
| (5) Absorbency | — | — | — | — | — | — | — | pass | pass | fail | pass | pass |
| (6) Mouthfeel | — | — | — | — | — | — | — | fail | pass | pass | pass | pass |
| Water ° C. | r.t. | r.t. | r.t. | r.t. | r.t. | r.t. | r.t. | 61.5[a] | 78.0[a] | 89.6[a] | r.t. | r.t. |

[a]Hot water requirement made production difficult
[b]Sheeted manually to a thickness of 1.0 mm
[c]Extruded

Examples 13-28

Rice dough compositions of Examples 13-28 were prepared according to Example 11 (63.4 wt. % rice flour, 0.22 wt. % xanthan gum, 0.53 wt. % PGA, 4.22 wt. % canola oil, 31.7 wt. % water at room temperature) except that the type of rice flour was varied. The source of the rice flour is

TABLE 4

Medium Grain Rice

| Rice ID | M-104 | M-202 | M-205 | M-206 | M-208 | M-401 | M-402 |
|---|---|---|---|---|---|---|---|
| Grain Type | MG | MG | MG | MG | MG | MG | MG |
| Quality Type | Calrose | Calrose | Calrose | Calrose | Calrose | Premium MG | Premium MG |
| L/W Ratio (Paddy) | 2.7 | 2.6 | 2.9 | 2.7 | 2.7 | 2.8 | 2.8 |
| L/W Ratio (Brown) | 2.3 | 2.1 | 2.3 | 2.2 | 2.3 | 23 | 2.3 |
| 1000 Grain (Brown) Wt. (g) | 24.1 | 23.9 | 24.4 | 24.6 | 24.9 | 25.6 | 22.5 |
| L/W Ratio (Milled) | 2.2 | 2.1 | 2.3 | 2.2 | 2.2 | 2.2 | 2.2 |
| AAC (%) | 17.8 | 16.5 | 17.8 | 17.7 | 17.3 | 18.1 | 17.5 |
| ASV | 6.4 | 6.9 | 6.9 | 6.4 | 6.8 | 7 | 7 |
| Protein (%) Brown | 7.8 | 7.5 | 7.1 | 6.7 | 6.2 | 5.9 | 6.5 |
| Protein (%) Milled | 7 | 6.6 | 6.3 | 5.9 | 5.6 | 5.2 | 5.8 |
| Pasting Properties | | | | | | | |
| Peak | 267 | 284 | 262 | 289 | 294 | 236 | 245 |
| Hot Paste | 147 | 140 | 146 | 146 | 161 | 134 | 123 |
| Cool Paste | 261 | 237 | 248 | 247 | 256 | 232 | 214 |
| Setback | −6 | −47 | −14 | −43 | −32 | −4 | −31 |
| Consistency | 110 | 99 | 100 | 101 | 113 | 95 | 92 |
| Breakdown | 123 | 142 | 119 | 144 | 132 | 105 | 123 |
| Pasting Temp. (° C.) | 74 | 72 | 71 | 72 | 72 | 70 | 70 |

TABLE 5

Short Grain Rice

| Rice ID | Akitakomachi | Koshihikari | Calhikari-201 | S-102 | Calmochi-101 | Calamylow-201 |
|---|---|---|---|---|---|---|
| Grain Type | SG | SG | SG | SG | Glutinous SG | SG |
| Quality Type | Premium SG | Premium SG | Premium SG | SG | Glutinous SG | Low Amylose SG |
| L/W Ratio (Paddy) | 2.3 | 2.2 | 2.1 | 2.2 | 2.2 | 2 |
| L/W Ratio (Brown) | 1.9 | 1.8 | 1.7 | 1.8 | 1.8 | 1.6 |
| 1000 Grain (Brown) Wt. (g) | 21.3 | 20 | 20.3 | 27.5 | 22.7 | 18.5 |
| L/W Ratio (Milled) | 1.8 | 1.7 | 1.7 | 1.7 | 1.8 | 1.6 |
| AAC (%) | 17.0 | 17.6 | 18.2 | 18.6 | 0.1 | 6.3 |
| ASV | 6.9 | 7 | 6.8 | 6.5 | 6.2 | 6.3 |
| Protein (%) Brown | 7.2 | 6.5 | 6.7 | 7 | 6.8 | 6.5 |
| Protein (%) Milled | 6.4 | 5.5 | 5.7 | 6.4 | 6.1 | 5.7 |
| Pasting Properties | | | | | | |
| Peak | 279 | 276 | 274 | 257 | 143 | 304 |
| Hot Paste | 152 | 141 | 148 | 151 | 55 | 104 |
| Cool Paste | 248 | 239 | 254 | 255 | 70 | 150 |
| Setback | −31 | −38 | −20 | −3 | −55 | −154 |
| Consistency | 97 | 99 | 104 | 101 | 28 | 48 |
| Breakdown | 126 | 134 | 128 | 110 | 76 | 201 |
| Pasting Temp. (° C.) | 71 | 70 | 73 | 72 | 69 | 72 |

TABLE 6

Long Grain Rice

| Rice ID | L-205 | L-206 | Calmati-201 | Calmati-202 |
|---|---|---|---|---|
| Grain Type | LG | LG | Aromatic LG | Aromatic LG |
| Quality Type | Superior LG (New Rex) | LG | Basmati | Basmati |
| L/W Ratio (Paddy) | 3.8 | 4.1 | 4.1 | 4.5 |
| L/W Ratio (Brown) | 3.2 | 3.6 | 3.4 | 3.9 |
| 1000 Grain (Brown) Wt. (g) | 21.7 | 23.2 | 20.8 | 22.2 |
| L/W Ratio (Milled) | 3.1 | 3.5 | 3.2 | 3.7 |
| AAC (%) | 24.1 | 23.1 | 23.3 | 24.8 |
| ASV | 5 | 4.5 | 4.8 | 4.4 |
| Protein (%) Brown | 8 | 6.9 | 9.1 | 8 |
| Protein (%) Milled | 7.7 | 6.2 | 8.6 | 7.5 |
| Pasting Properties | | | | |
| Peak | 272 | 241 | 206 | 205 |
| Hot Paste | 176 | 158 | 135 | 129 |
| Cool Paste | 353 | 296 | 279 | 264 |
| Setback | 81 | 55 | 73 | 59 |
| Consistency | 164 | 138 | 136 | 135 |
| Breakdown | 110 | 82 | 80 | 76 |
| Pasting Temp. (° C.) | 78 | 78 | 80 | 82 |

Evaluation

The rice dough compositions of Examples 11 and 13-28 were shaped using the sheeting procedure above and properties (1)-(6) were rated as either "pass" or "fail" for each property according to Table 2. The rice dough compositions were then categorized based on the following rating system, the results of which are presented in Tables 7 and 8:

Rice dough compositions which received a "pass" grade for each property (1)-(6) were deemed "Good"

Rice dough compositions which received a "fail" grade on one to two of properties (1)-(6) were deemed "OK"

Rice dough compositions which received a "fail" grade on three or more of properties (1)-(6) were deemed "Bad"

In the tables below, rice dough compositions which received a "Good" rating, and which did not require the use of hot water for making, are considered inventive. * Denotes the example is a comparative example.

TABLE 7

Evaluation of rice dough compositions of Examples 11 and 13-18

| | Ex. 11 | Ex. 13 | Ex. 14 | Ex. 15 | Ex. 16 | Ex. 17 | Ex. 18 |
|---|---|---|---|---|---|---|---|
| Rice ID | M-205 | M-202 | M-104 | M-206 | M-208 | M-401 | M-402 |
| Grain Type | MG | MG | MG | MG | MG | MG | MG |
| AAC (%) | 17.8 | 16.5 | 17.8 | 17.7 | 17.3 | 18.1 | 17.5 |
| Rating | Good | Good | Good | Good | Good | Good | Good |

TABLE 8

Evaluation of rice dough compositions of Examples 19-28

| | *Ex. 19 | *Ex. 20 | *Ex. 21 | *Ex. 22 | *Ex. 23 | *Ex. 24 | *Ex. 25 | *Ex. 26 | *Ex. 27 | *Ex. 28 |
|---|---|---|---|---|---|---|---|---|---|---|
| Rice ID | Akitakomachi | Koshihikari | Calhikari-201 | S-102 | Calmochi-101 | Calamylow-201 | L-205 | L-206 | Calmati-201 | Calmati-202 |

TABLE 8-continued

Evaluation of rice dough compositions of Examples 19-28

| | *Ex. 19 | *Ex. 20 | *Ex. 21 | *Ex. 22 | *Ex. 23 | *Ex. 24 | *Ex. 25 | *Ex. 26 | *Ex. 27 | *Ex. 28 |
|---|---|---|---|---|---|---|---|---|---|---|
| Grain Type | SG | SG | SG | SG | Glutinous SG | SG | LG | LG | Aromatic LG | Aromatic LG |
| AAC (%) | 17.0 | 17.6 | 18.2 | 18.6 | 0.1 | 6.3 | 24.1 | 23.1 | 23.3 | 24.8 |
| Rating | OK | OK | OK | OK | Bad | Bad | Bad | Bad | Bad | Bad |

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. A rice dough composition, comprising:
   50 to 80 wt. % of a rice flour from a medium grain rice;
   0.01 to 2 wt. % of xanthan gum;
   0.5 to 10 wt. % of an oil;
   0.1 to 5 wt. % of a propylene glycol alginate; and
   15 to 45 wt. % of water, each based on a total weight of the rice dough composition,
   wherein the rice dough composition is substantially free of modified cellulose polymers.

2. The rice dough composition of claim 1, wherein the medium grain rice has an apparent amylose content of 16 to 20 wt. %, based on a total starch content of the medium grain rice.

3. The rice dough composition of claim 1, wherein the medium grain rice has an apparent amylose content of 16.5 to 19 wt. %, based on a total starch content of the medium grain rice.

4. The rice dough composition of claim 1, wherein the oil is a plant-based oil.

5. The rice dough composition of claim 1, wherein the oil is a plant-based oil selected from the group consisting of olive oil, vegetable oil, canola oil, jojoba oil, coconut oil, and palm oil.

6. The rice dough composition of claim 1, wherein the oil is canola oil.

7. The rice dough composition of claim 1, wherein the propylene glycol alginate is formed by esterification of alginic acid or a salt thereof with propylene oxide.

8. The rice dough composition of claim 7, wherein at least 70% of a total number of carboxyl groups present in alginic acid or salt thereof are esterified with propylene oxide to form the propylene glycol alginate.

9. The rice dough composition of claim 1, wherein the rice flour from the medium grain rice is the only flour present.

10. The rice dough composition of claim 1, which is gluten-free.

11. The rice dough composition of claim 1, which contains no additional starch, other than starch present in the rice flour.

12. A method of making the rice dough composition of claim 1, comprising:
   adding an emulsion comprising the oil and the water to a dry mix comprising the rice flour, the xanthan gum, and the propylene glycol alginate; and
   mixing.

13. A shaped noodle product formed from the rice dough composition of claim 1, wherein the shaped noodle product is in the shape of a sheet, a sliced noodle, or an extrudate.

14. The shaped noodle product of claim 13, which is not frozen.

15. The shaped noodle product of claim 13, which is frozen.

16. A method of making the shaped noodle product of claim 13, comprising:
   shaping the rice dough composition into the shape of a sheet, a sliced noodle, or an extrudate;
   parboiling the shaped rice dough composition; and
   optionally freezing to form the shaped noodle product.

17. The rice dough composition of claim 1, wherein the oil is present in an amount of 4 to 10 wt. %, based on a total weight of the rice dough composition.

18. The rice dough composition of claim 1, wherein the propylene glycol alginate is present in an amount of 0.4 to 5 wt. %, based on a total weight of the rice dough composition.

* * * * *

UNITED STATES PATENT AND TRADEMARK OFFICE
CERTIFICATE OF CORRECTION

PATENT NO. : 10,785,999 B2
APPLICATION NO. : 16/265359
DATED : September 29, 2020
INVENTOR(S) : Yutaka Iwasaki et al.

It is certified that error appears in the above-identified patent and that said Letters Patent is hereby corrected as shown below:

On the Title Page

Item (73), the Assignee's information is incorrect. Item (73) should read:
--(73) Assignee: Ajinomoto Foods North America, Inc., Ontario, CA (US)--

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*